(12) United States Patent
Magennis et al.

(10) Patent No.: US 8,261,409 B2
(45) Date of Patent: Sep. 11, 2012

(54) GROMMET

(75) Inventors: Paul Magennis, Belfast (GB); Kevin Quinn, Newry (GB)

(73) Assignee: Short Brothers PLC, Belfast (IE)

( * ) Notice: Subject to any disclaimer, the term of this patent is extended or adjusted under 35 U.S.C. 154(b) by 280 days.

(21) Appl. No.: 12/598,722

(22) PCT Filed: Apr. 22, 2008

(86) PCT No.: PCT/GB2008/050280
§ 371 (c)(1),
(2), (4) Date: Nov. 3, 2009

(87) PCT Pub. No.: WO2008/135778
PCT Pub. Date: Nov. 13, 2008

(65) Prior Publication Data
US 2010/0139035 A1    Jun. 10, 2010

(30) Foreign Application Priority Data

May 5, 2007    (GB) .................................... 078823.0

(51) Int. Cl.
*F16L 5/00* (2006.01)
(52) U.S. Cl. ........................................................ 16/2.1
(58) Field of Classification Search ............... 16/2.1, 16/2.2, 2.5; 411/41, 45–48, 508, 509, 323, 411/913, 53, 57.1; 174/152 R, 153 G, 154, 174/152 G, 65 G; 248/56, 231.9
See application file for complete search history.

(56) References Cited

U.S. PATENT DOCUMENTS

| | | | |
|---|---|---|---|
| 2,912,712 A * | 11/1959 | Shamban et al. | 16/2.1 |
| 3,243,206 A | 3/1966 | Samer | |
| 3,366,356 A | 1/1968 | Fisher | |
| 3,506,999 A | 4/1970 | Neher | |
| 3,768,115 A * | 10/1973 | Hoffmann et al. | 16/2.1 |
| 4,180,297 A * | 12/1979 | Abrams | 312/406 |
| 4,192,477 A * | 3/1980 | Decky et al. | 248/56 |
| 4,621,961 A * | 11/1986 | Gulistan | 411/352 |
| 4,675,937 A | 6/1987 | Mitomi | |
| 4,892,979 A | 1/1990 | Rossow | |
| 5,243,139 A | 9/1993 | Law | |
| 5,537,714 A * | 7/1996 | Lynch et al. | 16/2.1 |
| 5,702,076 A | 12/1997 | Humber | |
| 6,374,455 B1 * | 4/2002 | Regele et al. | 16/2.1 |

(Continued)

FOREIGN PATENT DOCUMENTS

DE    23 36 280    2/1975

(Continued)

OTHER PUBLICATIONS

United Kingdom Search Report for International Application No. PCT/GB2008/050280. mailed Sep. 26, 2008.

(Continued)

*Primary Examiner* — Chuck Y. Mah
(74) *Attorney, Agent, or Firm* — Thomas & Karceski, PC

(57) ABSTRACT

A grommet (10) for use with the face or web of a component such as sheet material for protecting the surface of articles passing through apertures formed in said component, said grommet comprising a generally cylindrical main wall portion (12) having adjacent one axial end thereof an outwardly extending lip portion(14), said main wall portion including a plurality of axially directed resilient fingers (24), at least some of said fingers having means (26) for resisting disengagement of said grommet from said component.

19 Claims, 2 Drawing Sheets

U.S. PATENT DOCUMENTS

| | | | | |
|---|---|---|---|---|
| 6,460,638 | B1 * | 10/2002 | Strunsee et al. | 174/668 |
| 6,660,937 | B1 * | 12/2003 | MacLeod et al. | 174/659 |
| 6,765,148 | B2 * | 7/2004 | Rix | 174/650 |
| 2001/0049858 | A1 * | 12/2001 | Huet | 16/2.1 |
| 2003/0131443 | A1 * | 7/2003 | Trent | 16/2.1 |

FOREIGN PATENT DOCUMENTS

| | | |
|---|---|---|
| DE | 41 09 206 | 5/1992 |
| FR | 2 841 960 | 1/2004 |

OTHER PUBLICATIONS

Written Opinion for International Patent Application No. PCT/GB2008/050280.

International Search Report for International Application No. PCT/GB2008/050280. mailed Sep. 26, 2008.

Examination Report dated Nov. 22, 2011, for European Application No. 08 737 205.8.

* cited by examiner

GROMMET

CROSS-REFERENCE TO RELATED APPLICATION(S)

This United States Non-Provisional Patent Application is a National Stage Entry that relies for priority on PCT Patent Application No. PCT/GB2008/050280, filed on Apr. 22, 2008, and also relies for priority on Great Britain Patent Application No. 0708823.0, filed on May 5, 2007, the contents of both of which are incorporated herein by reference.

The present invention relates to a grommet for use in locating and protecting the surface of articles such as electrical cables and pipes passing through apertures in the face or web of a component.

Large structures such as aeroplanes, for example, utilise large quantities of relatively thin materials especially in internal structure such a fuselage frames, wing ribs and the like. It is frequently necessary to make or utilize existing apertures in such components to enable electrical cables and tubes, for example, to pass therethrough. The aperture itself is either cut, machined or punched and is often provided with a flange portion around the periphery of the aperture. Whether or not there is a flange portion, the remaining edge of the cut or punched portion of the aperture is often sharp and abrasive to items such as those described above which are required to pass through the aperture.

In addition to the need for cables and the like to merely pass through the aperture, it is also desirable to restrain unwanted movement of the article in the region of the aperture, generally both in the radial (with respect to the grommet/aperture) and longitudinal (with respect to the article) directions.

Known grommets, especially for aerospace use have been quite complex with regard to time and effort required to fit them and are consequently costly. In one type of grommet, it is first necessary to select the appropriate grommet material for the component aperture in question; cut the grommet material to length to surround the circumference of the aperture; apply adhesive to the grommet material/component aperture surfaces; install the grommet material around the aperture and cure the adhesive. In addition to this some form of article restraint such a "P" clip or the like is required and which necessitates drilling holes in the component and riveting, bolting or otherwise securing the clip/restraint in place.

It is an object of the present invention to provide a grommet which is quick and easy to install yet secure and provide for restraint of the article or articles passing therethrough. A further object of the grommet of the present invention is to accommodate a range of thicknesses of material with which it may be employed.

BRIEF SUMMARY OF THE DISCLOSURE

According to the present invention there is provided a grommet for use with a component for protecting the surface of articles passing through apertures formed in said component, said grommet comprising a generally cylindrical wall portion having adjacent one axial end thereof an outwardly extending lip portion, said wall portion including a plurality of axially directed resilient fingers, at least some of said fingers having means for resisting disengagement of said grommet from said aperture in said component.

In one embodiment of the present invention, the resilient fingers cooperate with the flange portion to resist disengagement.

In one embodiment of the present invention the cylindrical wall portion has a main diameter substantially corresponding to a diameter of the aperture in which it is to be inserted. In a further refinement of this embodiment, said main wall portion is a sliding fit that does not require excessive force to insert.

The axially directed resilient fingers may be formed directly from the wall portion by providing axially directed slots therein so as to permit the fingers to deform radially inwardly during initial insertion of the grommet into the aperture. The slots are preferably of a width that is less than the diameter of any one of the articles passing through the grommet, so as to prevent such article from being inserted in or entering said slots with the consequent potential damage that might result from the article being trapped or snagged in the said slots when being fed through the grommet, for example, or from fretting damage when installed. A further reason for the slots being smaller than the diameter or width of any article passing through the grommet is to prevent the articles from coming into contact either during installation or when installed with the probable sharp edge of the aperture in which the grommet is installed and thus preventing any possible damage due to abrasion or fretting.

In one embodiment, for example, there are six axially directed slots forming three resilient fingers wherein the slots may extend, when the grommet is installed in the aperture, all the way "through" the thickness of the component and the depth of any flange portion which may be present around the aperture.

The number of axially directed fingers may vary according to the diameter or size of the grommet. For example, a grommet intended to be inserted in a hole of about 20 mm diameter may have six axially directed slots forming three plain skirt panels and three fingers having means for resisting disengagement as described below. The circumferential length of the plain skirt panels and the fixing fingers may be different. Whilst the fingers having means to prevent disengagement are important, the plain skirt panels are also important and desirably should extend in an axial direction at least beyond the edge of the aperture in which the grommet is installed so as to prevent the articles passing through the grommet from coming into contact with the edge of the aperture. However, the circumferential width of the plain skirt panels is a result of the number of resilient fingers having means to resist disengagement which is a more important design consideration so as to ensure that the grommet is firmly anchored in the component aperture, the circumferential width per se of the plain skirt panels being of lesser importance other than that they protect the articles from the aperture edge.

The means for resisting disengagement of the grommet from the component may be any that is suitable. In one embodiment the means comprise wedge-shaped barb portions formed on the ends of at least some of the axially directed fingers. The barb portions have a minimum thickness at the end of the grommet, which provide a lead into the aperture and an increasing thickness along an axial length thereof. As the grommet is inserted into the aperture, the resilient fingers possessing the barbs deform radially inwardly until the barb portions are fully inserted and the thickest part exits the aperture and the resilient fingers having the barb portions spring radially outwardly to engage the face of the component or the end of a flange portion if present. Preferably, an axially inwardly face of the means for resisting disengagement of the grommet has a form such that an axially directed force to remove the grommet does not result in the resilient fingers being moved radially inwardly.

In a preferred embodiment, the outwardly extending lip portion is inclined relative to the axis of the generally cylindrical wall portion and in an axially inwardly direction such that the outer circumference of the lip portion provides an annular contact portion with the component surface that it contacts. Furthermore, the outwardly extending lip portion may preferably be resilient. Thus, the resilience of the downwardly inclined lip portion provides axial resilience in the grommet as a whole thus enabling the grommet to seat securely without undue axial play either in a range of different material thicknesses or accommodate a greater tolerance band of depth dimensions of a formed flange portion around the component aperture or both.

The degree of resilience in the lip portion of the grommet may be controlled and adjusted by several means including the provision of stiffness reducing slots or holes therein; varying the thickness of the material forming a radial wall of the lip portion relative to the cylindrical wall portion; and, varying the thickness of the material constituting the lip portion along the radial length thereof.

In its free state, the distance between the annular contact portion of the lip portion and the axially inner face of the barb portion, for example, may be slightly less than the thickness of the material or the depth of the flanged aperture into which the grommet is to be inserted so as to avoid unwanted axial play.

In a preferred embodiment of the grommet of the present invention there may be provided a radial slit through the whole grommet at one wall position thus, the grommet is still in a single piece but may be opened out or made smaller in circumferential size. The purpose of the radial slit is to provide a means whereby the grommet may easily be removed from the component aperture and replaced, without having to remove or displace the articles passing through the aperture.

In a further preferred embodiment, the grommet may be provided with means to restrain an article passing through the grommet when installed in the aperture. Such means may comprise at least one generally axially directed restraining member and may preferably be formed at one axial end of the grommet. The at least one restraining member may be formed as part of one or more of the axially directed resilient fingers, but preferably, the at least one restraining member may be provided at the end of the grommet having the lip portion and be associated with the wall portion and/or the lip portion as it is believed that this arrangement provides more stiffness to the restraining member.

The at least one restraining member may be a solid post-like member but having means thereon to co-operate with a tie of some form to anchor the article passing through the grommet thereto without the tie slipping off. Such means may comprise, for example, a lip, a protrusion, a saw-tooth form along an edge of the member or any other suitable means. However in a preferred embodiment of the restraining member, there may be provided a restraining member comprising a closed aperture. Such a closed aperture may take any suitable form and in one embodiment of the present invention the closed aperture comprises two or more generally parallel post-like members which may be parallel to the grommet axis and joined together at their ends remote from the point where the restraining member is joined to the grommet itself. A space between the two generally parallel post-like members provides positive location and anchorage for a conventional cable tie to pass through the gap between the two post portions. In another embodiment of the present invention, the closed aperture may be in the form of a loop such as a generally circular loop, for example.

In a further modified embodiment of the grommet according to the present invention a cable-tie or tube-tie band may be formed integrally with the at least one restraining member of the grommet.

Preferably, the grommet according to the present invention is made of a plastics material of a suitable type and the grommet moulded therefrom.

BRIEF DESCRIPTION OF THE DRAWINGS

In order that the present invention may be more fully understood, an example will now be described by way of illustration only with reference to the accompanying drawings, of which.

DETAILED DESCRIPTION

Figure 1:
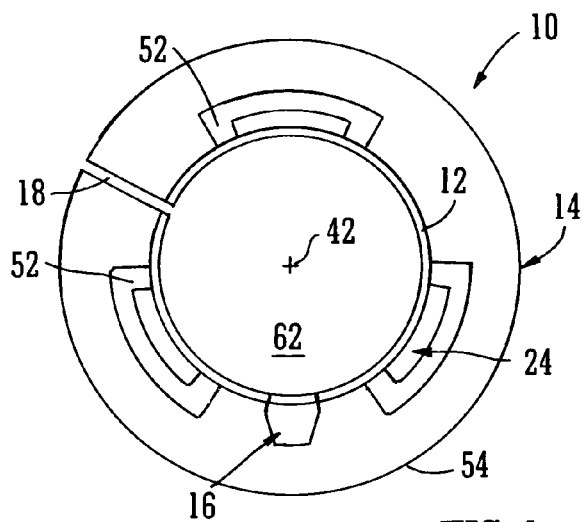
FIG. 1 shows a plan view of a preferred embodiment of a grommet according to the present invention.

Referring now to the drawings and where the same features are denoted by common reference numerals.

A grommet according to the present invention is indicated generally at 10 and comprises a generally cylindrical wall portion 12; a lip member 14 formed at one end of the grommet; and, a restraining member 16. The wall portion 12 and lip 14 has a radially directed slit 18 passing through the grommet in the axial direction thus making the grommet circumferentially discontinuous. The wall portion 12 is divided up in its lower region by axially directed slots 20 which effectively render the lower region of the wall portion into a plurality of resilient finger portions comprising skirt panels 22 and resilient fingers 24 which are also provided with retention means 26 (described below) to permit easy insertion of the grommet 10 into a hole 28 having a flange 30 in a sheet structural member indicated in part at 32 (whilst this embodiment is described with reference to a grommet 10 being installed in a component or part 32 having an aperture or hole 28 having a flange 30, it is stressed that it is not necessary that the aperture 28 has a flange 30, the principles and structural features described applying equally to a grommet 10 being installed in a component having a plain hole 28 having no flange). The retention means 26 comprise generally wedge-shaped barb portions 34. In this example there are three circumferentially narrower finger portions 24 and three circumferentially longer skirt panels 22 but this may vary according to, for example, the diameter of the grommet (i.e. the number and size of fingers/skirt panels may vary). The barb portions in the present embodiment have a first sloping face 36 which provide the wall portion with an effective diameter at the leading edge 38 of the barb portions slightly less than that of the hole 28 into which the grommet is to be inserted. The barb portions have a second sloping face portion 40 having a smaller angle of inclination to the grommet axis 42 than the first sloping face 36 (it should be noted that in other embodiments the face portions 36, 40 may be integrated into a common, single face having a single angle of inclination). At the axially innermost extent of the barb portions 34 there is a locking face portion 44 which is substantially normal to the axis 42 and which, when the grommet 10 is fully inserted in the hole 28, engages said hole 28, in the current embodiment with an end face 46 of the hole flange 30. Since both the barb locking face portions 44 and the flange end face 46 are both substantially parallel to each other there is no tendency for the two faces to move relative to each other in a radial direction and thus, there is no tendency for the grommet to inadvertently become disengaged from the hole 28. The lip member 14 extends in a downwardly and outwardly direction from the end of the wall portion 12 to which it is joined. The lip member 14 is resilient and forms in effect an axial spring to ensure that barb locking face portions 44 are securely seated on the edge of the component aperture due to the resilient force exerted by the lip member 14 by virtue of the deformation thereof on insertion into the component aperture. As may be seen in FIG. 3 the wall 50 is, in this embodiment, of substantially constant thickness, and therefore, acts as a disc spring. The resilience of the lip member may be changed in different grommet embodiments by changing the thickness of the lip member wall 50 and/or providing window portions 52 and/or changing the angle of the wall 50 of lip member 14 relative to the cylindrical wall 12 and which parameters may be used to alter the overall strength and/or resiliency of the lip member wall 50. The lip member 14 has an outer circumferential edge 54 which engages the surface 56 of the structural member 32. At the lip end of the grommet there is further provided a restraining or anchor member 16 for fixing a cable, bundle of cables and/or tubes or pipes (all not shown) passing through the central aperture 62 of the grommet. The anchor member comprises two post members 64, 66 which are generally parallel to the axis 42, the post members being joined at their ends by a bridging piece 68 to form a closed slot 70. A conventional cable tie, indicated in part only at 72 may be passed through the slot 70 to encircle the cable etc. and fix the same to the anchor member 16 to prevent radial and/or axial movement relative to the grommet. In other embodiments the restraining member 16 may have different forms such as, for example, a single post or a non-closed slot or other arrangements as described herein above.

The vertical distance "h" between the outer circumferential edge 54 of the flange and the barb face locking face 44 is, in the free state of the grommet, slightly less than the overall depth or thickness of the component, more specifically of hole flange 30. Thus, when the grommet is pressed fully into engagement in the hole 28 such that the edge 54 is in contact with the surface 56 of the structural member 32 and the two faces 44, 46 are engaged, the lip member wall 50 is resiliently deformed so that the structural member 32 is firmly gripped by the grommet 10. Of course, the distance "h" will vary from application to application to accommodate the range of thicknesses of component with which the grommet may be employed.

The axially directed slots 20 extend in the axial direction to an extent that they are at least coterminous with or extend slightly beyond the surface 56 of the structural member 32 on which the flange peripheral edge 54 bears in order to allow some radially inwardly flexibility of the finger portions 22, 24 to be accommodated in a hole which may have a greater degree of interference with the grommet than which would normally be desired.

In order to remove the grommet from the hole the facing edges of the radial slit 18 may be displaced relative to each other by forcing one face radially inwardly and the grommet removed whilst still leaving any cables or tubes passing through the aperture in place.

Figure 2:
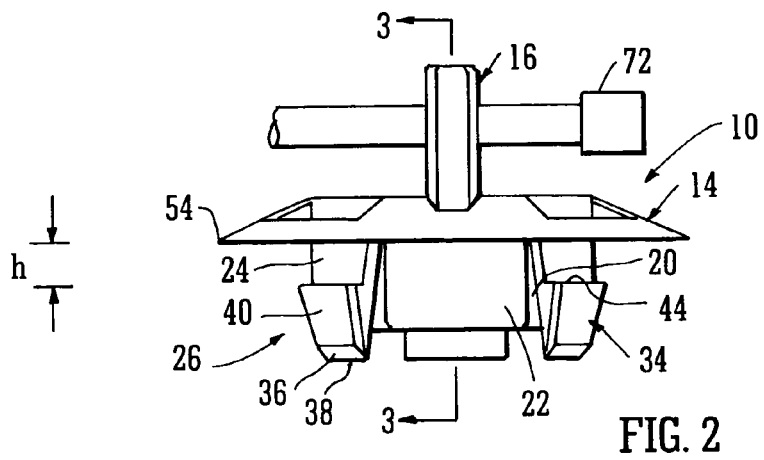
FIG. 2 show a view in elevation of the grommet of FIG. 1.
Figure 3:
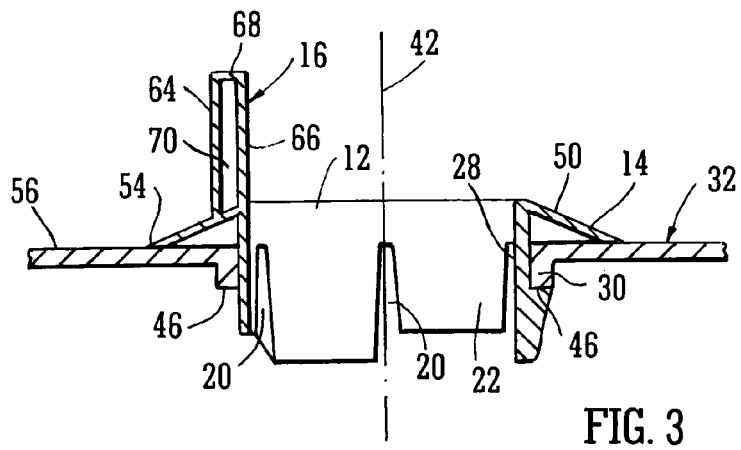
FIG. 3 which shows a cross section along the line 3-3 of FIG. 2.
Figures 4, 5:
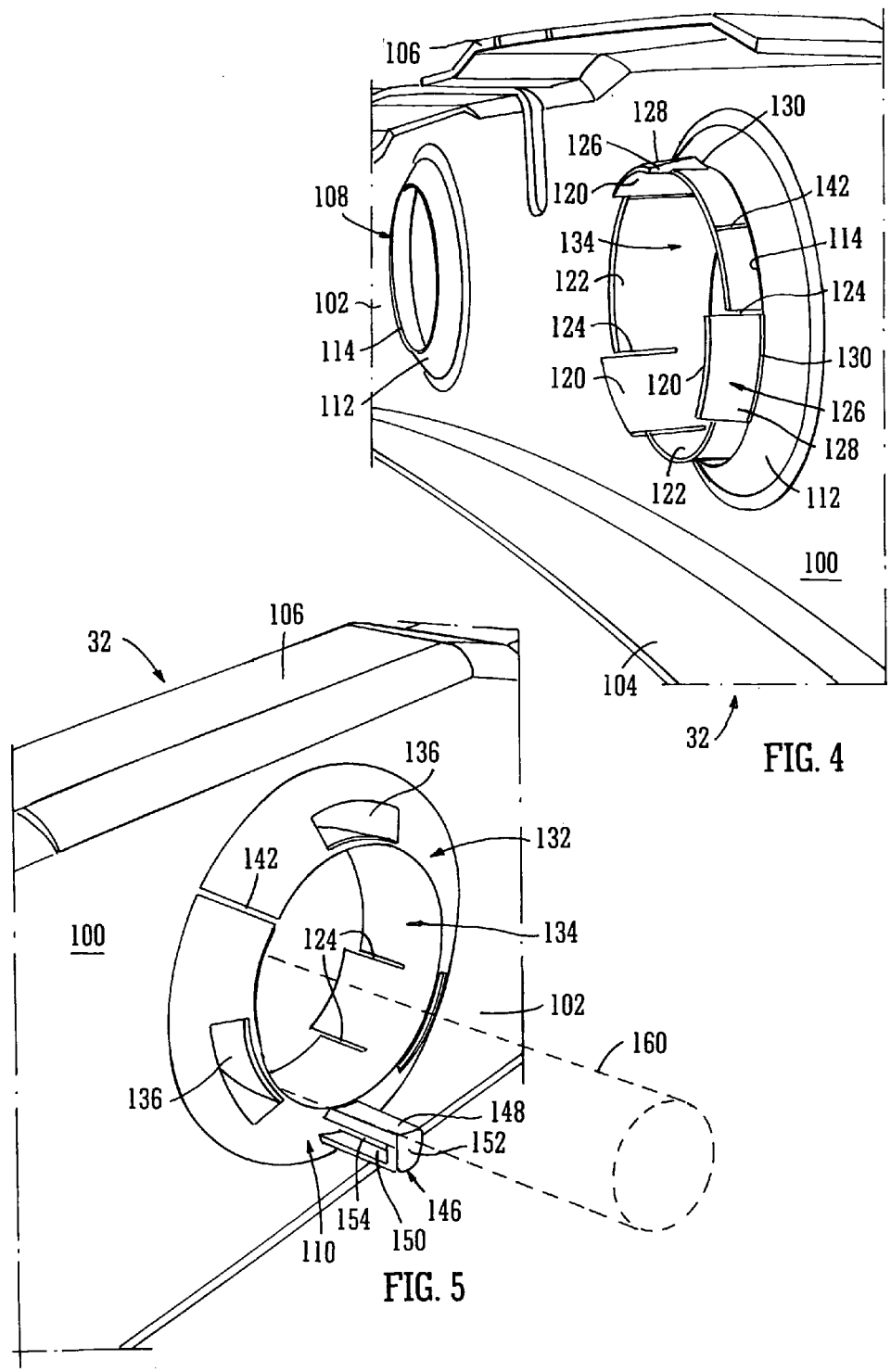
FIG. 4 shows an isometric view of the rear of part of a component having two holes therein, one of which is fitted with a grommet according to the present invention.
FIG. 5 which shows an isometric view of the front of the component of FIG. 4 of the hole having the fitted grommet.

FIGS. 4 and 5 show a perspective view of an embodiment of a grommet according to the present invention which is substantially the same as that described with reference to FIGS. 1 to 3. FIG. 4 shows part of a component 32 in the form of a fuselage frame 100 made from sheet metal and having a generally radially extending face 102 and stiffening webs 104, 106 extending generally axially. Holes 108 are provided in the frame both for weight reduction purposes and for routing cabling and the like therethrough. One hole 108 on the left as viewed in FIG. 4 is not fitted with a grommet whilst the right hand hole 108 is so fitted with a grommet 110. As may be seen in FIG. 4 the grommet-free hole 108 is provide with a stiffening flange 112 which is angled at other than 90° to the face 102, unlike the flange 30 shown in FIG. 3. However, it is repeated that the holes 108 may be plain holes having no flange and the presence or otherwise of a flange will depend upon the structural requirements of the component in question. The flange 112 has an edge 114 defining the flange aperture opening and which provides an abutment face for barb portions of grommet resilient fingers described below. The grommet 110 shown installed in the right hand hole of FIG. 4 has three resilient fingers 120 and three skirt panels 122 mutually separated by slots 124. The resilient fingers 120 are provided with wedge portions 126, in this case having a single angled sloping face 128 rather than the twin-angled sloping faces 36, 40 shown in the embodiment of FIGS. 1 to 3. Each wedge portion 126 has a locking face 130 which engages the edge 114 of the flange 112 to prevent unwanted disengagement of the grommet 110. Ideally the locking face 130 may be substantially parallel to the frame face 102. FIG. 5 shows the front face of the frame 100 of FIG. 4. The grommet 110 has a lip member 132 which is angled to the main wall portion 134 and has apertures 136 to aid in controlling the stiffness thereof as well as its weight. The lip member 132 has an outer circumferential seating edge 140 which abuts the front of face 102 whilst the lip member 132 is resiliently deformed in an axial direction so as to provide an axially directed resilient force retaining the grommet in the hole 108. The lip member 132 has a radially directed slit 142 to aid removal if required. The grommet 110 is provided with an integrally formed restraining member 146 comprising two axially oriented posts 148, 150 with a closure bar 152 connecting them to form an aperture 154 to receive an anchoring member such as a cable tie (not shown). A cable bundle 160 denoted by dashed lines is shown passing through the grommet 110 and which is anchored to the restraining member 146 with a suitable tie.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics described in conjunction with a particular aspect, embodiment or example of the invention are to be understood to be applicable to any other aspect, embodiment or example described herein unless incompatible therewith.

The invention claimed is:

1. A grommet for use with a component for protecting the surface of articles passing an aperture extending through a wall of the component, the grommet comprising:
   a cylindrical main wall portion,
   a lip portion connected to and extending outwardly and annularly from an axial end of the main wall portion,
   a plurality of first resilient fingers defined by the main wall portion, a plurality of second resilient fingers defined by the main wall portion, the second resilient fingers being interspersed between the first resilient fingers, and barb portions disposed on each of the second resilient fingers for resisting disengagement of the grommet from the aperture, wherein the plurality of first and second resilient fingers extend axially from the lip portion, and wherein the lip portion is resilient and cooperates with the barb portions to exert an axially compressive force on opposing surfaces of the wall of the component.

2. The grommet according to claim 1, wherein the main wall portion has an outside diameter substantially corresponding to an inside diameter of the aperture so as to provide a sliding fit therebetween.

3. The grommet according to claim 1, wherein the plurality of first resilient fingers and the plurality of second resilient fingers are separated from one another by slots in the main wall portion.

4. The grommet according to claim 3, wherein the slots have a width that is less than the diameter of any one of the articles passing through the grommet.

5. The grommet according to claim 1, wherein the plurality of second resilient fingers deform radially inwardly during insertion in the aperture.

6. The grommet according to claim 1, wherein the barb portions are wedge-shaped and are formed on the ends of the plurality of second resilient fingers.

7. The grommet according to claim 6, wherein the barb portions have an engagement face adjacent a thickest part of the wedge shape that is normal to an axis of the grommet.

8. The grommet according to claim 7 wherein, in use, the engagement face is resiliently biased into engagement with the wall of the component.

9. The grommet according to claim 1, wherein the lip portion is inclined relative to an axis of the grommet such that an outer circumference of the lip portion is positioned a predetermined distance from the axial end of the main wall portion.

10. The grommet according to claim 1, wherein resilience in the lip portion depends upon by at least one feature selected from the group comprising:

stiffness reducing slots or holes;

varying a thickness of a material forming the lip portion;

varying the thickness of the material forming the lip portion along a radial direction thereof;

varying a radial extent of the lip portion; and changing an angle between the lip portion and the main wall portion.

11. The grommet according to claim 1, further comprising:

a slit defined through the grommet between axial ends thereof.

12. The grommet according to claim 11, wherein the slit passes through one of the plurality of first resilient fingers.

13. The grommet according to claim 1, further comprising:

a restraining member axially extending from an end of the grommet.

14. The grommet according to claim 13, wherein the restraining member is disposed adjacent to the lip portion.

15. The grommet according to claim 14, wherein the restraining member is U-shaped, defining a space to permit a tie member to pass therethrough.

16. The grommet according to claim 14, further comprising:

a tie member formed integrally with the restraining member.

17. The grommet of claim 1, wherein barb portions are excluded from each of the first resilient fingers.

18. The grommet of claim 1, wherein the main wall portion, including the first and second resilient fingers, and the lip portion are integrally formed.

19. The grommet of claim 18, wherein the barb portions are integrally formed on each of the second resilient fingers.

* * * * *